US012608775B2

(12) United States Patent
Yang

(10) Patent No.: US 12,608,775 B2
(45) Date of Patent: Apr. 21, 2026

(54) METHOD FOR AUTOMATICALLY DETERMINING WHETHER TO PERFORM DENOISING

(71) Applicant: ZHEJIANG HEHU TECHNOLOGY CO., LTD., Hangzhou (CN)

(72) Inventor: Yi Yang, Hangzhou (CN)

(73) Assignee: ZHEJIANG HEHU TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/288,344

(22) Filed: Aug. 1, 2025

(65) Prior Publication Data

US 2026/0038097 A1 Feb. 5, 2026

(30) Foreign Application Priority Data

Aug. 1, 2024 (CN) .......................... 202411047872.3

(51) Int. Cl.
*G06T 5/70* (2024.01)
*G06T 7/11* (2017.01)
*G06V 10/74* (2022.01)

(52) U.S. Cl.
CPC .................. *G06T 5/70* (2024.01); *G06T 7/11* (2017.01); *G06V 10/761* (2022.01); *G06T 2207/20182* (2013.01)

(58) Field of Classification Search
CPC ... G06T 5/70; G06T 7/11; G06T 2207/20182; G06V 10/761
See application file for complete search history.

(56) References Cited

U.S. PATENT DOCUMENTS

| | | | |
|---|---|---|---|
| 2017/0177997 A1 | 6/2017 | Karlinsky et al. | |
| 2020/0201018 A1* | 6/2020 | Vaziri | ....................... G06T 7/11 |
| 2023/0070373 A1* | 3/2023 | Schwedt | .............. G02B 21/367 |

FOREIGN PATENT DOCUMENTS

| | | | | |
|---|---|---|---|---|
| CN | 114581910 A | * | 6/2022 | ............. G06F 18/22 |
| CN | 116188609 A | * | 5/2023 | ........... G06T 11/008 |
| CN | 117078514 A | | 11/2023 | |
| CN | 117876279 A | | 4/2024 | |

OTHER PUBLICATIONS

Notification to Grant Patent Right for Invention, Chinese Application No. 202411047872.3, mailed Sep. 27, 2024 (3 pages).
CNIPA, Office Action issued for Chinese Application No. 202411047872.3, mailed Sep. 6, 2024 (9 pages).
(Continued)

*Primary Examiner* — Michael Lee
(74) *Attorney, Agent, or Firm* — HOWARD M COHN and Associates, LLC

(57) ABSTRACT

A method for automatically determining whether to perform denoising includes the following steps: S1: scanning a sample using a light field microscopy system to obtain a light field microscopic image containing 4-dimensional information, where the sample is a sample to be 3D reconstructed; S2: rearranging the light field microscopic image to obtain a multi-view rearranged image; S3: calculating a cleanliness score of the multi-view rearranged image; and determining whether to perform denoising process on the multi-view rearranged image, based on the cleanliness score of the multi-view rearranged image.

9 Claims, 1 Drawing Sheet

(56)  References Cited

OTHER PUBLICATIONS

Xun Ding et al., "Optics and Precision Engineering", Three dimensional microscopic reconstruction of MEMS based on multi image fusion, vol. 26, No. 5, Full text, issuing date May 15, 2018.
Juan Wang et al., "Acta Automatica Sinica", Stippled Direct Part Mark Location Based on Self-adaptive Super-pixels Segmentation, vol. 41, No. 05, Full text, issuing date May 15, 2015.

* cited by examiner

S1

Scanning a sample by using a light field microscopy system to obtain a light field microscopic image containing 4D information, where the sample is a sample to be 3D reconstructed

S2

Rearranging the light field microscopic image to obtain a multi-view rearranged image

S3

Calculating a cleanliness score of the multi-view rearranged image; and determining whether to perform a denoising process on the multi-view rearranged image based on the cleanliness score of the multi-view rearranged image

METHOD FOR AUTOMATICALLY DETERMINING WHETHER TO PERFORM DENOISING

CROSS REFERENCE TO RELATED APPLICATIONS

The present disclosure claims the priority to the Chinese patent application with the filing No. 202411047872.3, entitled "METHOD FOR AUTOMATICALLY DETER-MINING WHETHER TO PERFORM DENOISING" and filed on Aug. 1, 2024 with the Chinese Patent Office, the contents of which are incorporated herein by reference in their entirety.

TECHNICAL FIELD

The present disclosure relates to the technical field of light field microscopy systems, and more particularly to a method for automatically determining whether to perform denoising.

BACKGROUND ART

As an emerging three-dimensional imaging technique, light field microscopy system may not only obtain high-resolution 3D reconstructed images, but also achieve rapid and non-destructive imaging, thus boasting broad application prospects in the biomedical field.

However, due to the complexity of the scanned samples and the limitations of the light field microscopy system itself, the final reconstructed 3D image is often affected by various noises, such as scattering noise, background noise, and detector noise. Relatively severe noise not only may reduce the quality of the 3D reconstructed image, but also may cause distortion of the 3D reconstructed image, thus affecting subsequent analysis and processing. Therefore, it is particularly important to quickly and accurately determine whether denoising needs to be performed on the light field microscopic images obtained by scanning samples with a light field microscopy system.

At present, whether denoising needs to be performed on the light field microscopic images obtained by scanning samples with a light field microscopy system depends entirely on the judgement based on the system user's personal experience, which is not only inefficient but also highly subjective.

Therefore, the problem to be urgently solved by those skilled in the art is how to provide a method for automatically determining whether to perform denoising, which is not only efficient but also provides a more objective determination result.

SUMMARY

In view of this, a purpose of the present disclosure is to provide a method for automatically determining whether to perform denoising, which not only is efficient but also provides a more objective determination result.

In order to achieve the above purpose, the present disclosure adopts the following technical solutions.

A method for automatically determining whether to perform denoising includes the following steps:

S1: scanning a sample by using a light field microscopy system to obtain a light field microscopic image containing 4D information, where the sample is a sample to be 3D reconstructed;

S2: rearranging the light field microscopic image to obtain a multi-view rearranged image; and S3: calculating a cleanliness score of the multi-view rearranged image; and determining whether to perform a denoising process on the multi-view rearranged image, based on the cleanliness score of the multi-view rearranged image.

Preferably, S3 specifically includes:

S31: selecting a central view image, an image adjacent to the left side of the central view image, and an image adjacent to the right side of the central view image from the multi-view rearranged image by using the microlens array parameters used by the scanning light field microscopy system;

S32: obtaining the cleanliness score of the multi-view rearranged image based on the central view image, the image adjacent to the left side of the central view image, and the image adjacent to the right side of the central view image;

S33: comparing the cleanliness score of the multi-view rearranged image with a preset threshold:

if the cleanliness score of the multi-view rearranged image is greater than or equal to the preset threshold, the denoising process does not need to be performed on the multi-view rearranged image; and if the cleanliness score of the multi-view rearranged image is less than the preset threshold, S34 is executed;

S34: dividing each of rearranged images of three views which are the central view image, the image adjacent to the left side of the central view image, and the image adjacent to the right side of the central view image, into n*n sub-images, where $$\frac{H}{200} \leq n \leq \frac{H}{100},$$

H indicates the pixel height of the central view image, the image adjacent to the left side of the central view image, and the image adjacent to the right side of the central view image;

S35: calculating cleanliness scores of corresponding sub-images of the images of three views, to obtain an image cleanliness score matrix; and S36: comparing the maximum value in the image cleanliness score matrix with the preset threshold:

if the maximum value in the image cleanliness score matrix is greater than or equal to the preset threshold, the denoising process does not need to be performed on the multi-view rearranged image; and if the maximum value in the image cleanliness score matrix is less than the preset threshold, the denoising process needs to be performed on the multi-view rearranged image.

Preferably, S32 specifically includes the following steps:

S321: calculating a structural similarity index measure between the central view image and the image adjacent to the left side of the central view image; and calculating a structural similarity index measure between the central view image and the image adjacent to the right side of the central view image; and S322: calculating the average of the two structural similarity index measures in S321, and using the average as the cleanliness score of the multi-view rearranged image.

Preferably, the following steps are adopted in S35 to calculate the cleanliness score of corresponding m-th sub-images of the images of three views:

S351: calculating a structural similarity index measure between the m-th sub-image in the central view image and the m-th sub-image in the image adjacent to the left side of the central view image, where $1<=m<=n^2$; and calculating a structural similarity index measure between the m-th sub-image in the central view image and the m-th sub-image in the image adjacent to the right side of the central view image; and S352: calculating the average of the two structural similarity index measures in S351, and using the average as the cleanliness score of the corresponding m-th sub-images of the images of three views.

Preferably, the structural similarity index measures in S321 and S351 are obtained by using the following formula:

$$SSIM(x, y) = [l(x, y)]^\alpha \cdot [c(x, y)]^\beta \cdot [s(x, y)]^\gamma;$$

where x and y indicate the images for which structural similarity index measures are to be calculated; SSIM(x, y) indicates the structural similarity index measure between image x and image y; l(x, y) indicates the brightness comparison function value of image x and image y; c(x, y) indicates the contrast comparison function value of image x and image y; s(x,y) indicates the structure comparison function value of image x and image y; $\alpha$, $\beta$ and $\gamma$ indicate the relative importance of brightness, contrast and structure respectively; $\alpha>0$; $\beta>0$; and $\gamma>0$.

Preferably, the calculation formulas of l(x, y), c(x, y) and s(x,y) are as follows:

$$l(x, y) = \frac{2\mu_x\mu_y + C_1}{\mu_x^2 + \mu_y^2 + C_1};$$

$$c(x, y) = \frac{2\sigma_x\sigma_y + C_2}{\sigma_x^2 + \sigma_y^2 + C_2};$$

$$s(x, y) = \frac{\sigma_{xy} + C_3}{\sigma_x\sigma_y + C_3};$$

where l(x, y) indicates the brightness comparison function value of image x and image y; c(x, y) indicates the contrast comparison function value of image x and image y; s(x,y) indicates the structure comparison function value of image x and image y; $\mu_x$ indicates the average value of all pixel values in image x; $\mu_y$ indicates the average value of all pixel values in image y; $\sigma_x$ indicates the standard deviation of all pixel values in image x; $\sigma_y$ indicates the standard deviation of all pixel values in image y; $\sigma_{xy}$ indicates a structure-aware operator; and $C_1$, $C_2$, $C_3$ are constants.

Preferably, the calculation formulas of $\mu_x$ and $\mu_y$ are as follows:

$$\mu_x = \frac{1}{N}\sum_{i=1}^{N} x_i;$$

$$\mu_y = \frac{1}{N}\sum_{i=1}^{N} y_i;$$

where $\mu_x$ indicates the average value of all pixel values in image x; $\mu_y$ indicates the average value of all pixel values in image y; N indicates the total number of pixels in image x and the total number of pixels in image y; $x_i$ indicates the pixel value of the i-th pixel in image x; and $y_i$ indicates the pixel value of the i-th pixel in image y.

Preferably, the calculation formulas of $\sigma_x$ and $\sigma_y$ are as follows:

$$\sigma_x = \left(\frac{1}{N-1}\sum_{i=1}^{N} (x_i - \mu_x)^2\right)^{\frac{1}{2}};$$

$$\sigma_y = \left(\frac{1}{N-1}\sum_{i=1}^{N} (y_i - \mu_y)^2\right)^{\frac{1}{2}};$$

where $\sigma_x$ indicates the standard deviation of all pixel values in image x; $\sigma_y$ indicates the standard deviation of all pixel values in image y; $\mu_x$ indicates the average value of all pixel values in image x; $\mu_y$ indicates the average value of all pixel values in image y; N indicates the total number of pixels in image x and the total number of pixels in image y; $x_i$ indicates the pixel value of the i-th pixel in image x; and $y_i$ indicates the pixel value of the i-th pixel in image y.

Preferably, the calculation formula of $\sigma_{xy}$ is as follows:

$$\sigma_{xy} = \frac{1}{N-1}\sum_{i=1}^{N} (x_i - \mu_x)(y_i - \mu_y);$$

where $\sigma_{xy}$ indicates the structure-aware operator; $\mu_x$ indicates the average value of all pixel values in image x; $\mu_y$ indicates the average value of all pixel values in image y; N indicates the total number of pixels in image x and the total number of pixels in image y; $x_i$ indicates the pixel value of the i-th pixel in image x; and $y_i$ indicates the pixel value of the i-th pixel in image y.

It can be seen from the above technical solutions that compared with the prior art, the present disclosure discloses a method for automatically determining whether to perform denoising, which can achieve the following beneficial technical effects:

1) The present disclosure can automatically determine whether to perform denoising process, which compared with the manual judgment method, is not only efficient but also more objective.

2) The present disclosure assists in realizing the fully automatic three-dimensional reconstruction process of the scanned sample by the light field microscopy system, unlike that in the background art in which the three-dimensional reconstruction is performed after manual judgment on whether to perform denoising.

BRIEF DESCRIPTION OF DRAWINGS

In order to more clearly illustrate the technical solutions in the embodiments of the present disclosure or in the prior art, the drawings required for use in the description of embodiments or the prior art will be briefly introduced below. Obviously, the drawings described below are only embodiments of the present disclosure. For a person ordinarily skilled in the art, other drawings may be obtained based on the provided drawings without paying creative work.

The sole FIGURE is a flow chart of a method for automatically determining whether to perform denoising provided by an embodiment of the present disclosure.

DETAILED DESCRIPTION OF EMBODIMENTS

The technical solutions in the embodiments of the present disclosure will be clearly and completely described below in conjunction with the drawings in the embodiments of the present disclosure. Obviously, the described examples are only some of the embodiments of the present disclosure, not all of the embodiments. Based on the embodiments of the present disclosure, all other embodiments obtained by a person ordinarily skilled in the art without creative work fall within the scope of protection of the present disclosure.

As shown in the sole FIGURE, an embodiment of the present disclosure discloses a method for automatically determining whether to perform denoising, including the following steps:

S1: scanning a sample by using a light field microscopy system to obtain a light field microscopic image containing 4D information, where the sample is a sample to be 3D reconstructed;

S2: rearranging the light field microscopic image to obtain a multi-view rearranged image with an unknown noise level; and S3: calculating a cleanliness score of the multi-view rearranged image; and determining whether to perform a denoising process on the multi-view rearranged image based on the cleanliness score of the multi-view rearranged image.

It may be understood that images of adjacent views have small parallax, and similar structures, and the noise of the image of each view is random and independent.

It may be understood that determining whether the multi-view rearranged image needs to be subjected to the denoising process is equivalent to determining whether the light field microscopic image needs to be subjected to denoising process, because the multi-view rearranged image and the light field microscopic image include the same noises and differs only in their forms of presentation on the compute.

Further, S3 specifically includes:

S31: selecting a central view image, an image adjacent to the left side of the central view image, and an image adjacent to the right side of the central view image from the multi-view rearranged image by using the microlens array parameters used by the scanning light field microscopy system; and S32: obtaining the cleanliness score of the multi-view rearranged image based on the central view image, the image adjacent to the left side of the central view image, and the image adjacent to the right side of the central view image.

Further, S32 specifically includes the following steps:

S321: calculating a structural similarity index measure between the central view image and an image adjacent to the left side of the central view image; and calculating a structural similarity index measure between the central view image and an image adjacent to the right side of the central view image, where further, the structural similarity index measure in S321 is obtained by the following formula:

$$SSIM(x, y) = [l(x, y)]^{\alpha} \cdot [c(x, y)]^{\beta} \cdot [s(x, y)]^{\gamma};$$

$$l(x, y) = \frac{2\mu_x\mu_y + C_1}{\mu_x^2 + \mu_x^2 + C_1};$$

$$c(x, y) = \frac{2\sigma_x\sigma_y + C_2}{\sigma_x^2 + \sigma_x^2 + C_2};$$

$$s(x, y) = \frac{\sigma_{xy} + C_3}{\sigma_x\sigma_y + C_3};$$

$$\mu_x = \frac{1}{N}\sum_{i=1}^{N} x_i;$$

$$\mu_y = \frac{1}{N}\sum_{i=1}^{N} y_i;$$

$$\sigma_x = \left(\frac{1}{N-1}\sum_{i=1}^{N} (x_i - \mu_x)^2\right)^{\frac{1}{2}};$$

$$\sigma_y = \left(\frac{1}{N-1}\sum_{i=1}^{N} (y_i - \mu_y)^2\right)^{\frac{1}{2}};$$

$$\sigma_{xy} = \frac{1}{N-1}\sum_{i=1}^{N} (x_i - \mu_x)(y_i - \mu_y);$$

where x and y indicate images for which the structural similarity index measures are to be calculated (specifically: when calculating the structural similarity index measure between the central view image and the image adjacent to the left side of the central view image, image x indicates the central view image, and image y indicates the image adjacent to the left side of the central view image; when calculating the structural similarity index measure between the central view image and the image adjacent to the right side of the central view image, image x indicates the central view image, and image y indicates the image adjacent to the right side of the central view image); SSIM(x, y) indicates the structural similarity index measure between the image x and image y; l(x, y) indicates the brightness comparison function value of the image x and image y; c(x, y) indicates the contrast comparison function value of image x and image y; s(x,y) indicates the structure comparison function value of image x and image y; $\alpha$, $\beta$, and $\gamma$ indicate the relative importance of brightness, contrast, and structure respectively; $\alpha>0$; $\beta>0$; $\gamma>0$; $\mu_x$ indicates the average value of all pixel values in image x, which represents the brightness level of image x; $\mu_y$ indicates the average value of all pixel values in image y, which represents the brightness level of image y; $\sigma_x$ indicates the standard deviation of all pixel values in image x, which represents the contrast level of image x; $\sigma_y$ indicates the standard deviation of all pixel values in image y, which represents the contrast level of image y; $\sigma_{xy}$ indicates a structure-aware operator; $C_1$, $C_2$ and $C_3$ are constants used to ensure stability when the denominator is 0; N indicates the total number of pixels of image x and the total number of pixels of image y (where the total number of pixels of image x is the same as the total number of pixels of image); $x_i$ indicates the pixel value of the i-th pixel in image x; and $y_i$ indicates the pixel value of the i-th pixel in image y; and S322: calculating the average of the two structural similarity index measurement values in S321, and using the average as the cleanliness score of the multi-view rearranged image;

S33: comparing the cleanliness score of the multi-view rearranged image with a preset threshold:

if the cleanliness score of the multi-view rearranged image is greater than or equal to the preset threshold, the denoising process does not need to be performed on the multi-view rearranged image; and If the cleanliness score of the multi-view rearranged image is less than the preset threshold, S34 is executed;

S34: dividing each of rearranged images of three views which are the central view image, the image adjacent to the left side of the central view image, and the image adjacent to the right side of the central view image, into n*n sub-images, where $$\frac{H}{200} \le n \le \frac{H}{100},$$

where H indicates the pixel height of the central view image, the image adjacent to the left side of the central view image, and the image adjacent to the right side of the central view image;

S35: calculating the cleanliness scores of corresponding sub-images of the images of three views, to obtain an image cleanliness score matrix;

where further, the following steps are adopted in S35 to calculate the cleanliness scores of corresponding m-th sub-images of the images of three views:

S351: calculating a structural similarity index measure between the m-th sub-image in the central view image and the m-th sub-image in image adjacent to the left side of the central view image, in the above, $1 <= m <= n^2$;

calculating a structural similarity index measure between the m-th sub-image in the central view image and the m-th sub-image in image adjacent to the right side of the central view image;

where further, the structural similarity index measure in S351 is obtained by using the following formula:

$$SSIM(x, y) = [l(x, y)]^\alpha \cdot [c(x, y)]^\beta \cdot [s(x, y)]^\gamma;$$

$$l(x, y) = \frac{2\mu_x\mu_y + C_1}{\mu_x^2 + \mu_x^2 + C_1};$$

$$c(x, y) = \frac{2\sigma_x\sigma_y + C_2}{\sigma_x^2 + \sigma_x^2 + C_2};$$

$$s(x, y) = \frac{\sigma_{xy} + C_3}{\sigma_x\sigma_y + C_3};$$

$$\mu_x = \frac{1}{N}\sum_{i=1}^{N} x_i;$$

$$\mu_y = \frac{1}{N}\sum_{i=1}^{N} y_i;$$

$$\sigma_x = \left(\frac{1}{N-1}\sum_{i=1}^{N} (x_i - \mu_x)^2\right)^{\frac{1}{2}};$$

$$\sigma_y = \left(\frac{1}{N-1}\sum_{i=1}^{N} (y_i - \mu_y)^2\right)^{\frac{1}{2}};$$

$$\sigma_{xy} = \frac{1}{N-1}\sum_{i=1}^{N} (x_i - \mu_x)(y_i - \mu_y);$$

where x and y indicate images for which the structural similarity index measures are to be calculated (specifically: when calculating the structural similarity index measure between the m-th sub-image in the central view image and the m-th sub-image in the image adjacent to the left side of the central view image, image x indicates the m-th sub-image in the central view image, and image y indicates the m-th sub-image in the image adjacent to the left side of the central view image; when calculating the structural similarity index measure between the m-th sub-image in the central view image and the m-th sub-image in the image adjacent to the right side of the central view image, image x indicates the m-th sub-image in the central view image, and image y indicates the m-th sub-image in the image adjacent to the right side of the central view image); SSIM(x,y) indicates the structural similarity index measure between image x and image y; l(x, y) indicates the brightness comparison function value of image x and image y; c(x, y) indicates the contrast comparison function value of image x and image y; s(x,y) indicates the structure comparison function value of image x and image y; $\alpha$, $\beta$, and $\gamma$ indicate the relative importance of brightness, contrast, and structure respectively; $\alpha > 0$; $\beta > 0$; $\gamma > 0$; $\mu_x$ indicates the average value of all pixel values in image x, which represents the brightness level of image x; $\mu_y$ indicates the average value of all pixel values in image y, which represents the brightness level of image y; $\sigma_x$ indicates the standard deviation of all pixel values in image x, which represents the contrast level of image x; $\sigma_y$ indicates the standard deviation of all pixel values in image y, which represents the contrast level of image y; $\sigma_{xy}$ indicates a structure-aware operator; $C_1$, $C_2$ and $C_3$ are constants used to ensure stability when the denominator is 0; N indicates the total number of pixels of image x and the total number of pixels of image y (where the total number of pixels of image x is the same as the total number of pixels of image); $x_i$ indicates the pixel value of the i-th pixel in image x; and $y_i$ indicates the pixel value of the i-th pixel in image y; and S352: calculating the average of the two structural similarity index measurement values in S351, and using the average as the cleanliness score of corresponding m-th sub-images of the images of three views.

It may be understood that as the parallax between adjacent views increases with the increase of sample thickness, the structural similarity then decreases. In order to prevent the influence of excessive parallax caused by excessive sample thickness, the present disclosure performs a secondary judgment when the cleanliness score of the multi-view rearranged image is less than the preset threshold.

S36: comparing the maximum value in the image cleanliness score matrix with the preset threshold:

if the maximum value in the image cleanliness score matrix is greater than or equal to the preset threshold, the denoising process does not need to be performed on the multi-view rearranged image; and if the maximum value in the image cleanliness score matrix is less than the preset threshold, the denoising process needs to be performed on the multi-view rearranged image.

It may be understood that: when the method of the present disclosure is used for three-dimensional reconstruction of a sample, the multi-view rearranged image is directly subjected to three-dimensionally reconstructing when it is automatically determined that the multi-view rearranged image does not need to be subjected to the denoising process; and when it is automatically determined that the multi-view rearranged image needs to be subjected to the denoising process, the multi-view rearranged image is input into the denoising network for denoising and then subjected to three-dimensional reconstruction. Obviously, the present disclosure realizes the fully automatic three-dimensional reconstruction process of the scanned sample by the light field microscopy system, unlike that in the background art in which the three-dimensional reconstruction is performed after manual judgment on whether to perform denoising.

In this specification, the embodiments are described in a progressive manner, and each embodiment focuses on the differences from other embodiments. The same or similar parts between the embodiments may be referred to each other. For the device disclosed in the embodiment, since it corresponds to the method disclosed in the embodiment, the description is relatively simple, and the relevant parts can be referred to the method parts.

The above description of the disclosed embodiments enables one skilled in the art to implement or use the present disclosure. Various modifications to these embodiments will be apparent to one skilled in the art, and the general principles defined herein may be implemented in other embodiments without departing from the spirit or scope of the present disclosure. Therefore, the present disclosure will not be limited to the embodiments shown herein, but rather will conform to the widest scope consistent with the principles and novel features disclosed herein.

The invention claimed is:

1. A method for automatically determining whether to perform denoising, comprising:

S1: scanning a sample by using a light field microscopy system to obtain a light field microscopic image containing 4D information, wherein the sample is a sample to be 3D reconstructed;

S2: rearranging the light field microscopic image to obtain a multi-view rearranged image; and S3: calculating a cleanliness score of the multi-view rearranged image; and determining whether to perform a denoising process on the multi-view rearranged image, based on the cleanliness score of the multi-view rearranged image;

wherein S3 specifically comprises:

S31: selecting a central view image, an image adjacent to a left side of the central view image, and an image adjacent to a right side of the central view image from the multi-view rearranged image by using microlens array parameters used by the scanning light field microscopy system;

S32: obtaining the cleanliness score of the multi-view rearranged image based on the central view image, the image adjacent to the left side of the central view image, and the image adjacent to the right side of the central view image;

S33: comparing the cleanliness score of the multi-view rearranged image with a preset threshold, wherein if the cleanliness score of the multi-view rearranged image is greater than or equal to the preset threshold, the denoising process does not need to be performed on the multi-view rearranged image; and if the cleanliness score of the multi-view rearranged image is less than the preset threshold, S34 is performed;

S34: dividing, into n*n sub-images, each of rearranged images of three views which are the central view image, the image adjacent to the left side of the central view image, and the image adjacent to the right side of the central view image, wherein $H/200 \leq n \leq H/100$, H indicates a pixel height of the central view image, the image adjacent to the left side of the central view image, and the image adjacent to the right side of the central view image;

S35: calculating corresponding sub-images of the images of three views to obtain an image cleanliness score matrix;

S36: comparing a maximum value in the image cleanliness score matrix with the preset threshold, wherein if the maximum value in the image cleanliness score matrix is greater than or equal to the preset threshold, the denoising process does not need to be performed on the multi-view rearranged image; and if the maximum value in the image cleanliness score matrix is less than the preset threshold, the denoising process needs to be performed on the multi-view rearranged image.

2. The method for automatically determining whether to perform denoising according to claim 1, wherein S32 specifically comprises following steps:

S321: calculating a structural similarity index measure between the central view image and the image adjacent to the left side of the central view image; and calculating a structural similarity index measure between the central view image and the image adjacent to the right side of the central view image; and S322: calculating an average of two structural similarity index measurement values in S321, and using the average as the cleanliness score of the multi-view rearranged image.

3. The method for automatically determining whether to perform denoising according to claim 1, wherein S35 uses following steps to calculate a cleanliness scores of corresponding m-th sub-images of the images of three views:

S351: calculating a structural similarity index measure between the m-th sub-image in the central view image and the m-th sub-image in the image adjacent to the left side of the central view image, wherein $1 <= m <= n^2$; and calculating a structural similarity index measure between the m-th sub-image in the central view image and the m-th sub-image in the adjacent image on the right side of the central view image; and S352: calculating an average of two structural similarity index measures in S351, and using the average as the cleanliness score of the corresponding m-th sub-images of the images of three views.

4. The method for automatically determining whether to perform denoising according to claim 3, wherein the structural similarity index measures in S321 and S351 are obtained by using following formula:

$$SSIM(x, y) = [l(x, y)]^\alpha \cdot [c(x, y)]^\beta \cdot [s(x, y)]^\gamma;$$

wherein x and y indicate images for which the structural similarity index measure is to be calculated; SSIM(x,y) indicates a structural similarity index measure of an image x and an image y; l(x,y) indicates a brightness comparison function value of the image x and the image y, c(x,y) indicates a contrast comparison function value of the image x and the image y; s(x,y) indicates a structure comparison function value of the image x and the image y; $\alpha$, $\beta$ and $\gamma$ indicate relative importance of brightness, contrast and structure respectively; $\alpha > 0$; $\beta > 0$; and $\gamma > 0$.

5. The method for automatically determining whether to perform denoising according to claim 4, wherein calculation formulas of the l(x,y), the c(x,y) and the s(x,y) are as follows respectively:

$$l(x, y) = \frac{2\mu_x\mu_y + C_1}{\mu_x^2 + \mu_x^2 + C_1};$$

$$c(x, y) = \frac{2\sigma_x\sigma_y + C_2}{\sigma_x^2 + \sigma_x^2 + C_2};$$

$$s(x, y) = \frac{\sigma_{xy} + C_3}{\sigma_x\sigma_y + C_3};$$

wherein l(x,y) indicates the brightness comparison function value of the image x and the image y, c(x,y) indicates the contrast comparison function value of the image x and the image y; s(x,y) indicates the structure comparison function value of the image x and the image y; $\mu_x$ indicates an average value of all pixel values in the image x; $\mu_y$ indicates an average value of all pixel values in the image y; $\sigma_x$ indicates an standard deviation of all pixel values in the image x; $\sigma_y$ indicates an standard deviation of all pixel values in the image y; $\sigma_{xy}$ indicates a structure-aware operator; and $C_1$, $C_2$ and $C_3$ are constants.

6. The method for automatically determining whether to perform denoising according to claim 5, wherein calculation formulas of the $\mu_x$ and the $\mu_y$ are as follows respectively:

$$\mu_x = \frac{1}{N}\sum_{i=1}^{N} x_i;$$

$$\mu_y = \frac{1}{N}\sum_{i=1}^{N} y_i;$$

wherein $\mu_x$ indicates the average value of all pixel values in the image x; $\mu_y$ indicates the average value of all pixel values in the image y; N indicates a total number of pixels in the image x and a total number of pixels in the image y; $x_i$ indicates a pixel value of an i-th pixel in the image x; and $y_i$ indicates a pixel value of the i-th pixel in the image y.

7. The method for automatically determining whether to perform denoising according to claim 6, wherein calculation formulas of the $\sigma_x$ and the $\sigma_y$ are as follows respectively:

$$\sigma_x = \left(\frac{1}{N-1}\sum_{i=1}^{N} (x_i - \mu_x)^2\right)^{\frac{1}{2}};$$

-continued $$\sigma_y = \left(\frac{1}{N-1}\sum_{i=1}^{N} (y_i - \mu_y)^2\right)^{\frac{1}{2}};$$

wherein $\sigma_x$ indicates the standard deviation of all pixel values in the image x; $\sigma_y$ indicates the standard deviation of all pixel values in the image y; $\mu_x$ indicates the average value of all pixel values in the image x; $\mu_y$ indicates the average value of all pixel values in the image y; N indicates the total number of pixels in the image x and the total number of pixels in the image y; $x_i$ indicates the pixel value of the i-th pixel in the image x; and $y_i$ indicates the pixel value of the i-th pixel in the image y.

8. The method for automatically determining whether to perform denoising according to claim 6, wherein a calculation formula of $\sigma_{xy}$ is:

$$\sigma_{xy} = \frac{1}{N-1}\sum_{i=1}^{N} (x_i - \mu_x)(y_i - \mu_y);$$

wherein $\sigma_{xy}$ indicates the structure-aware operator; $\mu_x$ indicates the average value of all pixel values in the image x; $\mu_y$ indicates the average value of all pixel values in the image y; N indicates the total number of pixels in the image x and the total number of pixels in the image y; $x_i$ indicates the pixel value of the i-th pixel in the image x; and $y_i$ indicates the pixel value of the i-th pixel in the image y.

9. The method for automatically determining whether to perform denoising according to claim 2, wherein S35 uses following steps to calculate a cleanliness scores of corresponding m-th sub-images of the images of three views:

S351: calculating a structural similarity index measure between the m-th sub-image in the central view image and the m-th sub-image in the image adjacent to the left side of the central view image, wherein 1<=m<=n²; and calculating a structural similarity index measure between the m-th sub-image in the central view image and the m-th sub-image in the adjacent image on the right side of the central view image; and S352: calculating an average of two structural similarity index measures in S351, and using the average as the cleanliness score of the corresponding m-th sub-images of the images of three views.

* * * * *